US011423405B2

(12) United States Patent
Whitney et al.

(10) Patent No.: US 11,423,405 B2
(45) Date of Patent: Aug. 23, 2022

(54) PEER VALIDATION FOR UNAUTHORIZED TRANSACTIONS

(71) Applicant: INTERNATIONAL BUSINESS MACHINES CORPORATION, Armonk, NY (US)

(72) Inventors: Michael J. Whitney, Cary, NC (US); Colm Nolan, Navan (IE); Mark Maresh, Wake Forest, NC (US); Juan F Vargas, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 16/566,007

(22) Filed: Sep. 10, 2019

(65) Prior Publication Data

US 2021/0073818 A1    Mar. 11, 2021

(51) Int. Cl.
G06Q 20/40 (2012.01)
(52) U.S. Cl.
CPC ... G06Q 20/4016 (2013.01); G06Q 20/40145 (2013.01)
(58) Field of Classification Search
None
See application file for complete search history.

(56) References Cited

U.S. PATENT DOCUMENTS

| 8,078,538 | B1 | 12/2011 | Buch |
| 8,740,067 | B1 | 6/2014 | Chinoy |
| 9,584,540 | B1 | 2/2017 | Chan |
| 9,747,640 | B1 | 8/2017 | Chan et al. |
| 9,754,254 | B2 | 9/2017 | Bayer |
| 10,037,534 | B2 | 7/2018 | Matthews |

(Continued)

FOREIGN PATENT DOCUMENTS

| CN | 108053318 A | 5/2018 |
| CN | 109299954 A | 2/2019 |

(Continued)

OTHER PUBLICATIONS

Credithydra, "Prosperity and Credit Inclusion for the Next 5 Billion", Whitepaper(p. 9-40),attached: Agarwal at al., "Hyda-Decentralized Credit Reporting", http://www.credithydra.com/, printed May 22, 2019, pp. 1-40.

(Continued)

*Primary Examiner* — Jamie R Kucab
(74) *Attorney, Agent, or Firm* — Tihon Poltavets (57) ABSTRACT

A method for peer validation for unauthorized transactions includes receiving a request to validate a user performing a transaction anomaly, wherein the transaction anomaly represents a potential fraudulent financial transaction. The method, responsive to identifying one or more boundaries to search for validation users, identifies a set of validation users in the identified one or more boundaries, where each validation user from the set of validation users has the ability to visually confirm the user performing the transaction as a valid user associated with an account for the transaction anomaly. The method displays information for the valid user associated with the account for the transaction anomaly. The method, responsive to determining the user is not validated for the transaction anomaly, declines the transaction anomaly.

18 Claims, 6 Drawing Sheets

(56) References Cited

U.S. PATENT DOCUMENTS

| | | | |
|---|---|---|---|
| 10,148,649 B2* | 12/2018 | Rajakumar | H04L 63/0861 |
| 11,288,675 B1* | 3/2022 | Juarez | G06Q 20/405 |
| 2007/0162761 A1 | 7/2007 | Davis | |
| 2010/0250676 A1* | 9/2010 | Ufford | G06Q 10/107 |
| | | | 709/204 |
| 2014/0331278 A1* | 11/2014 | Tkachev | H04L 63/08 |
| | | | 726/1 |
| 2014/0331282 A1* | 11/2014 | Tkachev | G06F 21/31 |
| | | | 726/3 |
| 2016/0275516 A1* | 9/2016 | Bender | H04L 63/102 |
| 2017/0257364 A1* | 9/2017 | Ligatti | H04L 63/102 |
| 2017/0301038 A1 | 10/2017 | Mawji | |
| 2017/0357971 A1 | 12/2017 | Pitz | |
| 2018/0330378 A1 | 11/2018 | Fredinburg | |

FOREIGN PATENT DOCUMENTS

| | | |
|---|---|---|
| CN | 109325774 A | 2/2019 |
| ES | 2327111 T3 | 10/2009 |
| WO | 2014145431 A1 | 9/2014 |
| WO | 2017180382 A1 | 10/2017 |

OTHER PUBLICATIONS

Mell et al., "The NIST Definition of Cloud Computing", National Institute of Standards and Technology, Special Publication 800-145, Sep. 2011, pp. 1-7.

International Search Report and Written Opinion, Application No. PCT/IB2020/057400, dated Nov. 19, 2020, pp. 1-9.

* cited by examiner

PEER VALIDATION FOR UNAUTHORIZED TRANSACTIONS

FIELD OF INVENTION

This disclosure relates generally to preventing unauthorized transactions, and in particular to utilizing peer validation to prevent unauthorized transactions.

BACKGROUND OF THE INVENTION

Presently, consumer financial fraud, identity theft, and personal data breach incidents are common occurrences in the digital landscape. Financial institutions employ a variety of techniques including pattern detection and analytics to identify potential instances of fraud, while performing an action to prevent and/or isolate the potential instance of fraud from occurring. A financial institution typically monitors credit card usage or other financial instruments to determine whether a particular purchase falls outside of a user's typical purchasing pattern. In the event a particular purchase falls outside of the user's typical purchasing pattern, the financial institution typically declines the particular purchase and locks an account associated with the credit card or other financial instrument utilized for the particular purchase attempt. False positives can occur when the user attempts to purchase an item in another geographical location (e.g., different country), where the user would have to delay the particular purchase attempt while attempting to resolve the declined purchase with the financial institution.

SUMMARY

Embodiments in accordance with the present invention disclose a method, computer program product and computer system for peer validation for unauthorized transactions, the method, computer program product and computer system can receive a request to validate a user performing a transaction anomaly, wherein the transaction anomaly represents a potential fraudulent financial transaction. The method, computer program product and computer system can, responsive to identifying one or more boundaries to search for validation users, identifying, by one or more processors, a set of validation users in the identified one or more boundaries, where each validation user from the set of validation users has the ability to visually confirm the user performing the transaction as a valid user associated with an account for the transaction anomaly. The method, computer program product and computer system can display information for the valid user associated with the account for the transaction anomaly. The method, computer program product and computer system can, responsive to determining the user is not validated for the transaction anomaly, decline the transaction anomaly.

DETAILED DESCRIPTION

Embodiments of the present invention allow for a pool or set of validation users to verify another user performing a financial transaction, where the financial transaction is identified as a transaction anomaly. Embodiments of the present invention can identify visual boundaries surrounding a specific location within a retail location where the transaction anomaly is identified. The set of validation users within the visual boundaries can visually locate the user attempting to perform the transaction anomaly and validate the user attempting to perform the transaction anomaly as the valid user associated with an account for the transaction anomaly. Embodiments of the present invention notifies the set of validation users of a pending validation event and displays information (e.g., appearance characteristics, photo of the valid user) for visually identifying the user attempting to perform the transaction anomaly as the valid user associated with an account for the transaction anomaly. In the event the user is validated, the transaction anomaly is authorized and in the event the user is not validated, the transaction anomaly is declined. For a declined transaction anomaly, an alert is sent to the valid user with information regarding the declined transaction anomaly and the user who attempted to perform the declined transaction anomaly.

Figure 1:
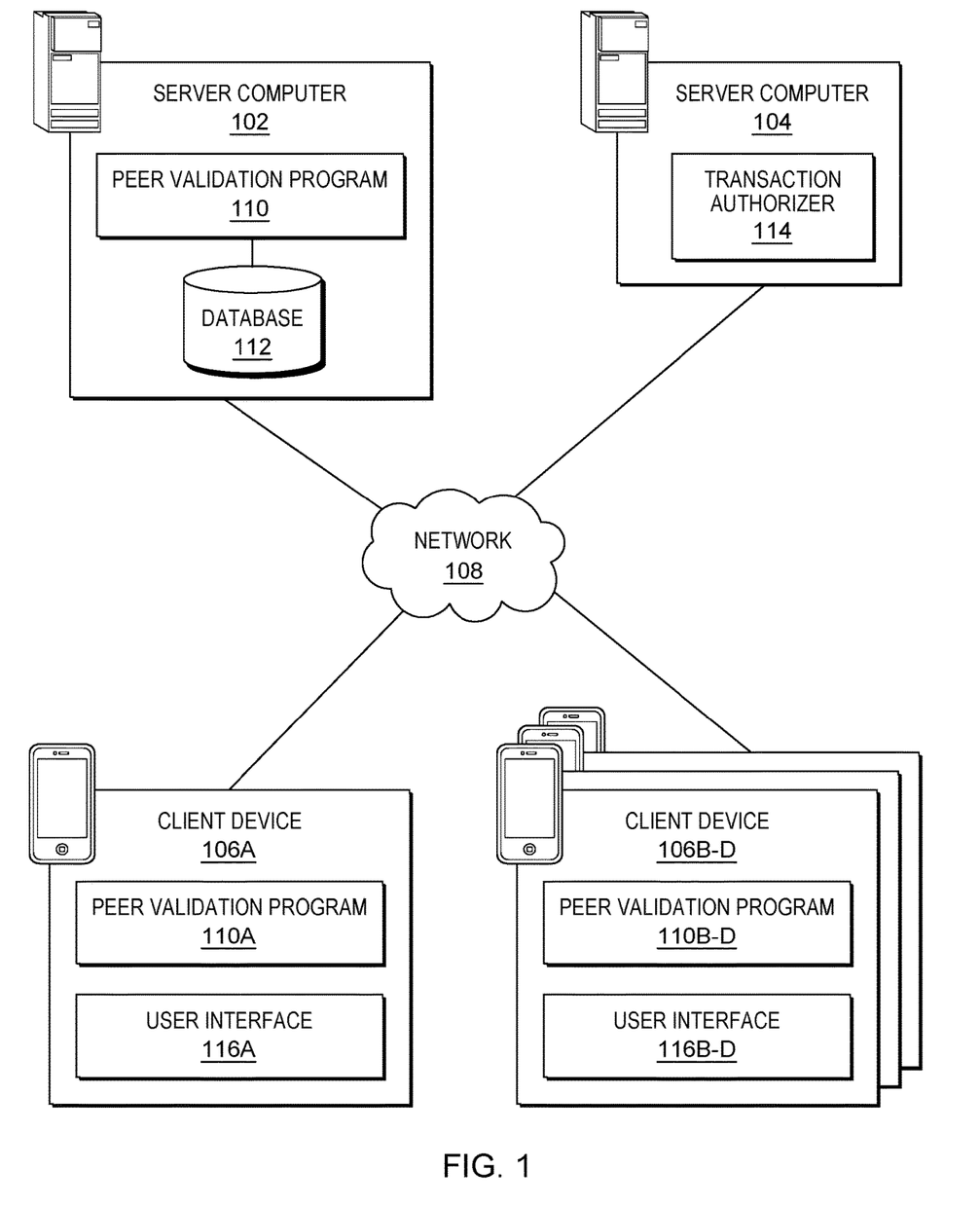
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, server computer 104, and client device 106A-D all interconnected over network 1108. For discussion purposes, peer validation program 110 operates on server computer 102 but in other embodiments, peer validation program 110 can operate on client device 106A-D.

Server computer 102 may be a desktop computer, a laptop computer, a tablet computer, a specialized computer server, a smartphone, or any computer system capable of executing the various embodiments of peer validation program 110. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes database 112 and peer validation program 110 capable of communicating with server computer 104 and peer validation program 110A-D on client device 106A-D, respectively. Server computer 102 may include internal and external hardware components, as depicted and described in further detail with respect to FIG. 4.

Server computer 104 may be a desktop computer, a laptop computer, a tablet computer, a specialized computer server, a smartphone, or any computer system capable of executing the various embodiments of transaction authorizer 114. In certain embodiments, server computer 104 represents a computer system utilizing clustered computers and components that act as a single pool of seamless resources when accessed through network 108, as is common in data centers and with cloud computing applications. In general, server computer 104 is representative of any programmable electronic device or combination of programmable electronic devices capable of executing machine-readable program instructions and communicating with other computer devices via a network. In this embodiment, server computer 104 includes transaction authorizer 114 capable of communicating with peer validation program 110 operating on server computer 102. In another embodiment, transaction authorizer 114 operates on server computer 102, along with peer validation program 110. In yet another embodiment, transaction authorizer 114 operates on server computer 102, where peer validation program 110 is an integral component of transaction authorizer 114.

Each of client device 106A-D can be a laptop computer, a tablet computer, a smart phone, smart watch, a smart speaker, or any programmable electronic device capable of communicating with various components and devices within the distributed data processing environment, via network 108. In this embodiment, client device 106A is associated with a valid user, whose account is experiencing a transaction anomaly by an invalid user. Client device 106B-D are associated with validation users for validating the user performing the transaction anomaly. Each of client device 106A-D may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, each of client device 106A-D represents one or more programmable electronic devices or combination of programmable electronic devices capable of executing machine readable program instructions and communicating with other computing devices (not shown) within the distributed data processing environment via a network, such as network 108. In one embodiment, client device 106B-D represents a plurality of devices associated with a respective user in a location where peer validation program 110 identifies a transaction anomaly. A transaction anomaly represents a potential fraudulent financial transaction. Each of client device 106A-D includes user interface 116A-D, respectively. Client device 106A-D can each utilize one or more of location services via a communication provider, Wi-Fi triangulation, or an integrated Global Positioning System (GPS) for identifying a location of the respective user in a retail location. In some embodiments, one or more functions of peer validation program 110 can be performed locally by one or more peer validation program 110A-D on respective client device 106A-D.

User interface 116A-D enables a user to make requests of or issue commands to a respective client device 106A-D and receive information and instructions in response. In one embodiment, a user of each client device 106A-D accesses a respective user interface 116A-D via voice commands in natural language. In one embodiment, each of user interface 116A-D may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, each of user interface 116A-D may also be mobile application software. In an example, mobile application software, or an "app," is a computer program designed to run on smart phones, tablet computers and other mobile devices. Each of user interface 116A-D enables a user of each client device 106A-D to interact with peer validation program 110 on server computer 102.

Peer validation program 110 can identify a transaction anomaly associated with a user by utilizing information received from transaction authorizer 114 associated with one or more financial institutions. Transaction authorizer 114 monitors a plurality of accounts associated with a plurality of users to determine whether a transaction being performed by a user utilizing a monitored account is an anomaly. In a previously discussed alternative embodiment, transaction authorizer 114 is integrated into peer validation program 110, where peer validation program 110 monitors the plurality of accounts associated with the plurality of users and can identify a transaction anomaly associated with a user. Peer validation program 110 can receive a request to validate the user performing the transaction by utilizing a set of validation users (e.g., users of client device 106B-D) to validate the user attempting to perform the transaction. Peer validation program 110 can identify boundaries to search for validation users and identify the set of validation users in the identified user to query. Peer validation program 110 can notify the set of validation users of a pending validation event, where the pending validation event represents the user attempting to perform the transaction that was previously identified as the transaction anomaly.

Peer validation program 110 can display information associated with the user for the validation event to the set of validation users in user interface 116B-D on client device 106B-D, respectively. Response to one or more users from the set of validation users validating the user attempting to perform the transaction, peer validation program 110 authorizes the transaction. Responsive to one or more users from the set of validation users not validating the user attempting to perform the transaction, peer validation program 110 declines the transaction. Additionally, peer validation program 110 can send an alert to a valid user (i.e., user of client device 106A) based on the transaction anomaly, where the valid user represents a user associated with the account for which peer validation program 110 identified the transaction anomaly. Upon receiving the alert, the valid user (i.e., user of client device 106A) has the ability to validated the user performing the transaction anomaly.

Database 112 is a repository for data used by peer validation program 110. In the depicted embodiment, database 112 resides on server computer 102. In another embodiment, database 112 may reside on server computer 104 or elsewhere within distributed data processing environment provided peer validation program 110 has access to database 112. A database is an organized collection of data. Database 112 can be implemented with any type of storage device capable of storing data and configuration files that can be accessed and utilized by peer validation program 110, such as a database server, a hard disk drive, or a flash memory. Database 112 stores data used by peer validation program 110, such as user profiles, user preferences, user account information, user client device (e.g., client device 106A-D) information, and the like.

In general, network 108 can be any combination of connections and protocols that will support communications between server computer 102, server computer 104, and client device 106A-D. Network 108 can include, for example, a local area network (LAN), a wide area network (WAN), such as the internet, a cellular network, or any combination of the preceding, and can further include wired, wireless, and/or fiber optic connections. In one embodiment, peer validation program 110 can be a web service accessible via network 108 to a user of each client device 106A-B. In another embodiment, peer validation program 110 may be operated directly by a user of server computer 102.

Figure 2:
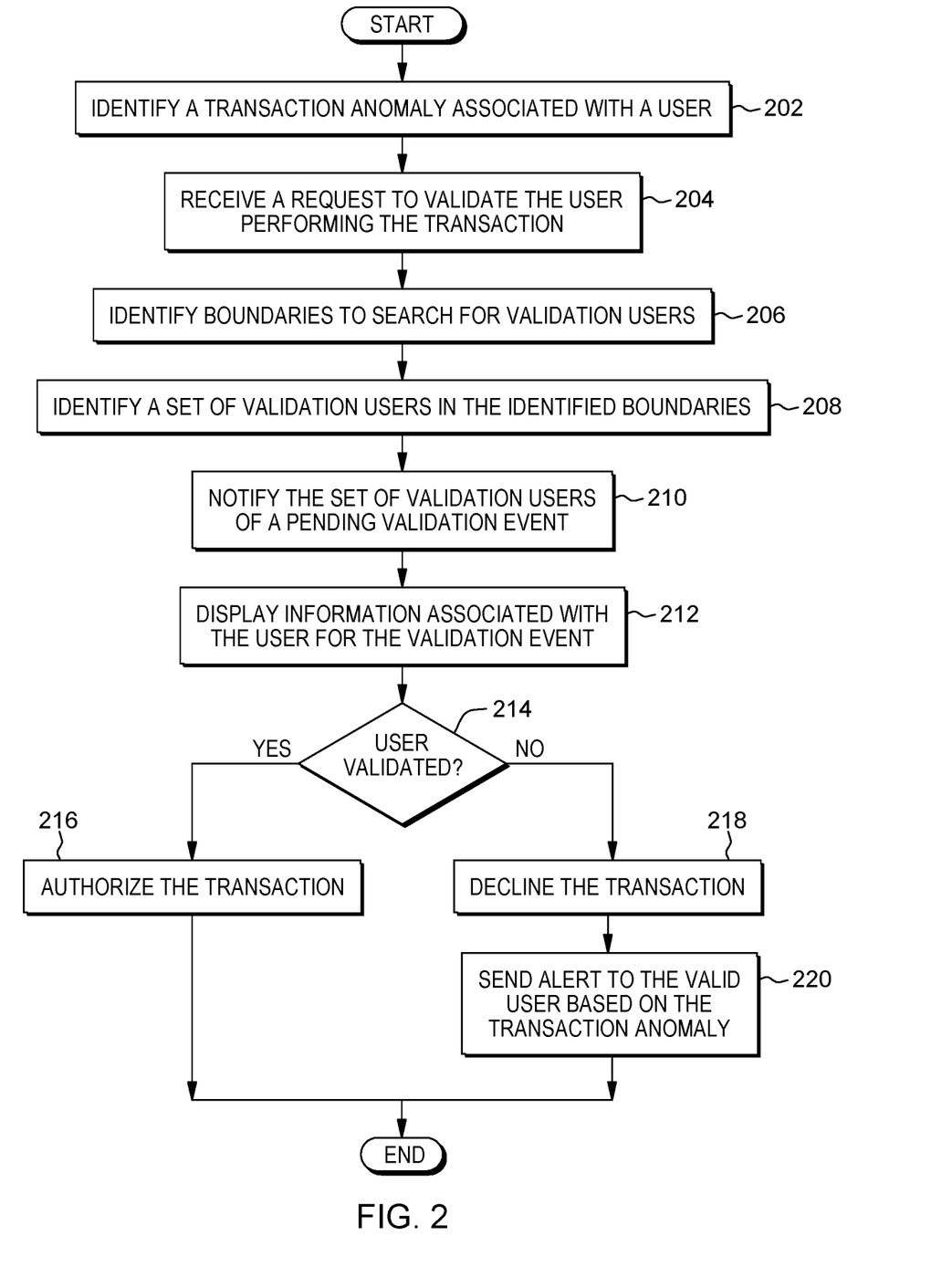
FIG. 2 is a flowchart depicting operational steps of a peer validation program for utilizing peer validation to prevent unauthorized transactions, in accordance with an embodiment of the present invention.

FIG. 2 is a flowchart depicting operational steps of a peer validation program for utilizing peer validation to prevent unauthorized transactions, in accordance with an embodiment of the present invention.

Peer validation program 110 utilizes a network of validation users to validate a user attempting to perform a transaction, where peer validation program 110 has identified the transaction as an anomaly. Each of the validation users has the ability to opt-in or opt-out of the network of validation users via a web or mobile application based on a preference of each of the validation users. The preference can be time based, where a user can opt-in to be included in the network of validation users between the hours of 9 am and 5 pm and can opt-out to be excluded from the network of validation users for the remaining hours. The preference can also be location based, where a user can opt-in to be include in the network of validation users at a retail location (e.g., home improvement store) and can opt-out to be excluded from the network of validation users at a restaurant location. Peer validation program 110 can monitor a location of each validation user through an associated client device, where peer validation program 110 can utilizes the location of each validation user to identify a set of validation users (i.e., pool of users) from the network of validation users to perform a user validation, also referred to as a validation event. Registration of each validation user in the network of validation users enables peer validation program 110 to query the set of validation users for a pending validation event for a transaction anomaly. Peer validation program 110 can utilize monetary incentives for users who opt-in the network of validation user, where a validation user can for example receive discounts, lower interest rates, and pay per validation event response.

Peer validation program 110 identifies (202) a transaction anomaly associated with a user. A transaction anomaly represents a financial transaction (e.g., purchase) that occurs outside of a typical financial transactional pattern for an account (e.g., credit card account) associated with a user performing the transaction anomaly. An example of a transaction anomaly can include a purchase with a monetary value that exceeds a predetermined monetary value threshold or previously established monetary value purchasing pattern. Another example of a transaction anomaly can include a purchase in a geographic location (e.g., Paris, France) that is outside of a previously established geographic location purchasing pattern (e.g., San Francisco, Calif.). In this embodiment, peer validation program 110 identifies the transaction anomaly associated with a user by receiving a notification from a transaction authorizer indicating a transaction anomaly occurred for a particular account associated with a particular user. In another embodiment, peer validation program 110 utilizes an integrated transaction authorizer to identify a transaction anomaly has occurred for a particular account associated with a particular user.

Peer validation program 110 receives (204) a request to validate the user performing the transaction. In this embodiment, peer validation program 110 receives a request to validate the user performing the transaction from the transaction authorizer, subsequent to a determination a user validation is possible for the transaction anomaly. In one example, a user utilizing a credit card associated with account "A" is attempting to purchase electronic equipment (e.g., television) with a high monetary value at a retail location, where the purchase is identified as a transactional anomaly. The transaction authorizer determines a user validation is possible for the transaction anomaly, since the retail location is a public setting that can include a set of validation users from a network of validation users to validate the user performing the transactional anomaly. In another example, a user utilizing a credit card associated with account "B" is attempting to purchase electronic equipment (e.g., television) with a high monetary value utilizing a web-based retailer, where the purchase is identified as a transactional anomaly. The transaction authorizer determines a user validation is not possible for the transaction anomaly, since the web-based retailer is a remote and non-public setting. In yet another example, a user utilizing a credit card associated with account "C" is attempting to pay for an airline ticket at a travel agency in a foreign country, where the purchase is identified as a transactional anomaly due to a monetary value exceeding a pre-determined monetary value purchasing pattern and a geographical location outside of a pre-determined geographical purchasing pattern. The transaction authorizer determines a user validation is not warrantied for the transaction anomaly, since the transaction anomaly overly exceeds the established purchasing patterns and the user is to contact the financial institution associated with account "C".

Peer validation program 110 can receive a request to validate the user performing the transaction anomaly as a second factor authentication. In one example, a user utilizing a credit card associated with account "A" is attempting to purchase electronic equipment (e.g., television) with a high monetary value at a retail location, where the purchase is identified as a transactional anomaly. A first factor authentication is utilized to validate the purchase, where the first factor authentication includes establishing a phone call utilizing a number for a client device associated with a user for account "A". The second factor authentication includes peer validation program 110 receiving a request to validate the user performing the transaction anomaly to ensure the client device associated with the user for account "A" was not stolen. Instances when peer validation program 110 performs a peer validation can be based on a situational risk level, where a user has the ability to set the situational risk level based on a geographic location (e.g., radius from a home location).

Peer validation program 110 identifies (206) boundaries to search for validation users. In this embodiment, peer validation program 110 identifies boundaries to search for a set of validation users from the network of validation users, where the boundaries surround a specific location within a retail location. The retail location is identified utilizing Global Positioning System (GPS) or Wi-Fi information for a terminal and/or electronic reader device attempting to process the transaction anomaly. Alternatively, peer validation program 110 can utilize an index of existing retail locations and relationships to identify a retail location for the transaction anomaly. For larger establishments, peer validation program 110 identifies a specific location for a terminal and/or electronic reader device within the retail location based on information received from the retail location to establish a boundary for the network of validation users. A larger establishment is a retail location with multiple checkout lines located across multiple departments areas (e.g., garden, auto service, electronics) within the retail location. For smaller establishments with one or several checkout lines in a single area of the retail location, peer validation program 110 identifies the retail location as the specific location. Peer validation program 110 can utilize publicly available geospatial map data for the retail location to define boundaries for the specific location in the retail location for larger establishment. For smaller establishments, peer validation program 110 can utilize the publicly available geospatial map data to define the boundaries for the retail location as the specific location. Alternatively, peer validation program 110 can utilizes a predefined radius (e.g., 10 meters) to identify the boundary for the specific location.

In one example, peer validation program 110 identifies a retail location as a large establishment, where a transaction anomaly occurred at an electronic reader device at a checkout. Peer validation program 110 identifies the specific location within the retail location as one of the primary checkout lines located near an exit of the retail location. Peer validation program 110 utilizes geospatial map data to identify boundaries for the specific location that extends to multiple surround checkout lines and multiple aisles within a vicinity of the specific location. In another example, peer validation program 110 identifies a retail location as a smaller establishment, where a transaction anomaly occurred at an electronic reader device at a checkout. Peer validation program 110 identifies the specific location as the retail location and utilizes geospatial map data to identify boundaries for the specific location that includes an area of the retail location accessible by a consumer. In yet another example, peer validation program 110 identifies a retail location as an outdoor food event, where a transaction anomaly occurred at an electronic reader device on a mobile food truck. Peer validation program 110 identifies the specific location as the mobile food struck and utilizes a predefined radius (e.g., 20 meters) surrounding the specific location as the boundary.

Peer validation program 110 identifies (208) a set of validation users in the identified boundaries. As previously discussed, a client device associated with each validation user utilizes one or more of location services via a communication provider, Wi-Fi triangulation, Bluetooth, and an integrated Global Positioning System (GPS) to identify a location for the respective validation user. Peer validation program 110 utilizes location information for each validation user to identify one or more validation users located in the identified boundaries surrounding the specific location at the retail location. Additionally, peer validation program 110 determines whether the identified one or more validation users located in the identified boundaries have previously opted-in or opted-out of being utilized to validate a user performing the transaction anomaly. Peer validation program 110 identifies the set of validation users in the identified boundaries, where each validation user in the set of validation users has previously opted-in being utilized to validate the user performing the transaction anomaly. For instances where a large number of validation users from the network of validation users are present in the identified boundaries, peer validation program 110 randomly selects a portion of the large number of validation users in the identified boundaries to validate the user performing the transaction anomaly. Alternatively, peer validation program 110 selects a portion of the large number of validation users in the identified boundaries that is nearest to the user performing the transaction anomaly.

When identifying the set of validation users in the identified boundaries, peer validation program 110 can utilize pattern detecting algorithms to safeguard against a particular validation user with an association with the user performing the transaction anomaly from being included in the set of validation users. Peer validation program 110 can identify instances when the particular validation user has previously validated the user performing a transaction anomaly and excluded the particular validation user from being included in the set of validation users. Furthermore, peer validation program 110 can identify instances when the particular validation user was in a vicinity of the user performing a transaction anomaly during one or more previous validation events and excluded the particular validation user from being included in the set of validation users. Peer validation program 110 can utilize publicly available social networking information to determine if a relationship (e.g., friend, relative) exists between the particular user and the user performing a transaction anomaly and excluded the particular validation user from being included in the set of validation users. Furthermore, peer validation program 110 has the ability to notify the transaction authorizer (i.e., financial institution) of the potentially fraudulent activity of the particular validation user attempting to validate the user performing a transaction anomaly.

Peer validation program 110 notifies (210) the set of validation users of a pending validation event. In this embodiment, peer validation program 110 notifies each validation user from the set of validation users of a pending validation event to determine if each validation user is able to validate the user performing the transaction anomaly (i.e., validation event). Peer validation program 110 queries each validation user from the set of validation users by displaying a notification of a pending validation event in a user interface of a client device associated with each validation user. Peer validation program 110 can receive a confirmation or rejection from the validation user regarding the pending validation event. In the event peer validation program 110 receives a confirmation from the validation user, peer validation program 110 displays information associated with the user for the validation event. In the event peer validation program 110 receives a rejection from the validation user, peer validation program 110 can identify a replacement validation user for inclusion in the set of validation users. In one example, peer validation program 110 notifies a validation user from the set of validation users of a pending validation event but the validation user rejects the pending validation event because the validation user forgot to wear glasses.

Peer validation program 110 displays (212) information associated with the user for the validation event. In this embodiment, peer validation program 110 displays information associated with user for the validation event, where the information includes a name, a height measurement, hair color, and any other identifiable traits of a user associated with an account for the identified traction anomaly. Peer validation program 110 displays the information in a user interface of client device associated with each validation user from the set of validation users. Each validation user from the set of validation users can view the information that peer validation program 110 displays and determine whether a visual description of the user associated with the account for the identified transaction anomaly matches a visual description of the user performing the transaction anomaly at the retail location. In another embodiment, peer validation program 110 displays one or more images of the user associated with the account, where peer validation program 110 renders a face of the user in each of the one or more images as unidentifiable through pixelation to protect the privacy of the user. Each validation user from the set of validation users can compare the one or more images of the user associated with the account to the user performing the transaction anomaly. Peer validation program 110 can display, in the user interface, the one or more images of the user associated with the account as an overlay, when a camera function on the client device is activated.

Peer validation program 110 determines (214) whether the user is validated for the transaction anomaly. In the peer validation program 110 determines the user is validated for the transaction anomaly ("yes" branch, 214), peer validation program 110 authorizes (216) the transaction. In the event peer validation program 110 determines the user is not validated for the transaction anomaly ("no" branch, 214), peer validation program 110 declines (218) the transaction. Peer validation program 110 displays multiple selectable options in a user interface of a client device associated with each validation user from the set of validation users, where the selectable options can include a confirmation selection, a rejection selection, and an inconclusive selection. The confirmation selection indicates that the user is validated for the transaction anomaly, the rejection selection indicates that the user is not validated for the transaction anomaly, and the inconclusive selection indicates the user is not validated but another validation user from the set of validations can still validate the user preforming the transaction anomaly. Each selectable option can include a fillable field in the user interface, where a validation user can input comments concerning the validation of the user performing the transaction anomaly.

Peer validation program 110 authorizes (216) the transaction. Peer validation program 110 authorizes the transaction by sending a user validation notification to transaction authorizer (i.e., financial institution) to authorize the transaction identified as a transaction anomaly. Peer validation program 110 can also send one or more images captured by a validation user of the user performing the transaction anomaly and any comments provided by a validation user to the transaction authorizer.

Peer validation program 110 declines (218) the transaction. Peer validation program 110 declines the transaction by sending a user validation notification to transaction authorizer (i.e., financial institution) to declining the transaction identified as a transaction anomaly. In another embodiment, peer validation program 110 instructs the transaction authorizer to decline the transaction anomaly. Peer validation program 110 can also send one or more images of the user performing the transaction anomaly captured by a validation user and any comments provided by a validation user, to the transaction authorizer to assist with resolving any potential security breaches surrounding the account associated with the transaction anomaly.

Peer validation program 110 sends (220) alert to the valid user based on the transaction anomaly. As previously discussed, the valid user represents a user associated with the account for which peer validation program 110 identified the transaction anomaly. Peer validation program 110 identifies a client device of the valid user by utilizing an integrated index of users, associated client devices (e.g., mobile phone) for each of the users, and preferred methods of contact (e.g., text, email). In another embodiment, peer validation program 110 identifies a client device of the valid user by querying a financial institution associated with the account and receiving contact information for the valid user. In one example, peer validation program 110 sends an alert to the valid user based on the transaction anomaly, where the alert is sent via text to a client device associate with the valid user. In another example, peer validation program 110 sends an alert to the valid user based on the transaction anomaly, where the alert is sent via email to an email address associated with the account peer validation program 110 identified the transaction anomaly. The alert can include a notification identifying the account that experienced the transaction anomaly, a location of the transaction anomaly, a time of the transaction anomaly, and a statement that the user performing the transaction anomaly could not be validated by the set of validation users. The alert can further include one or more images of the user performing the transaction anomaly captured by a validation user and any comments provided by a validation user during the validation event.

Figure 3:
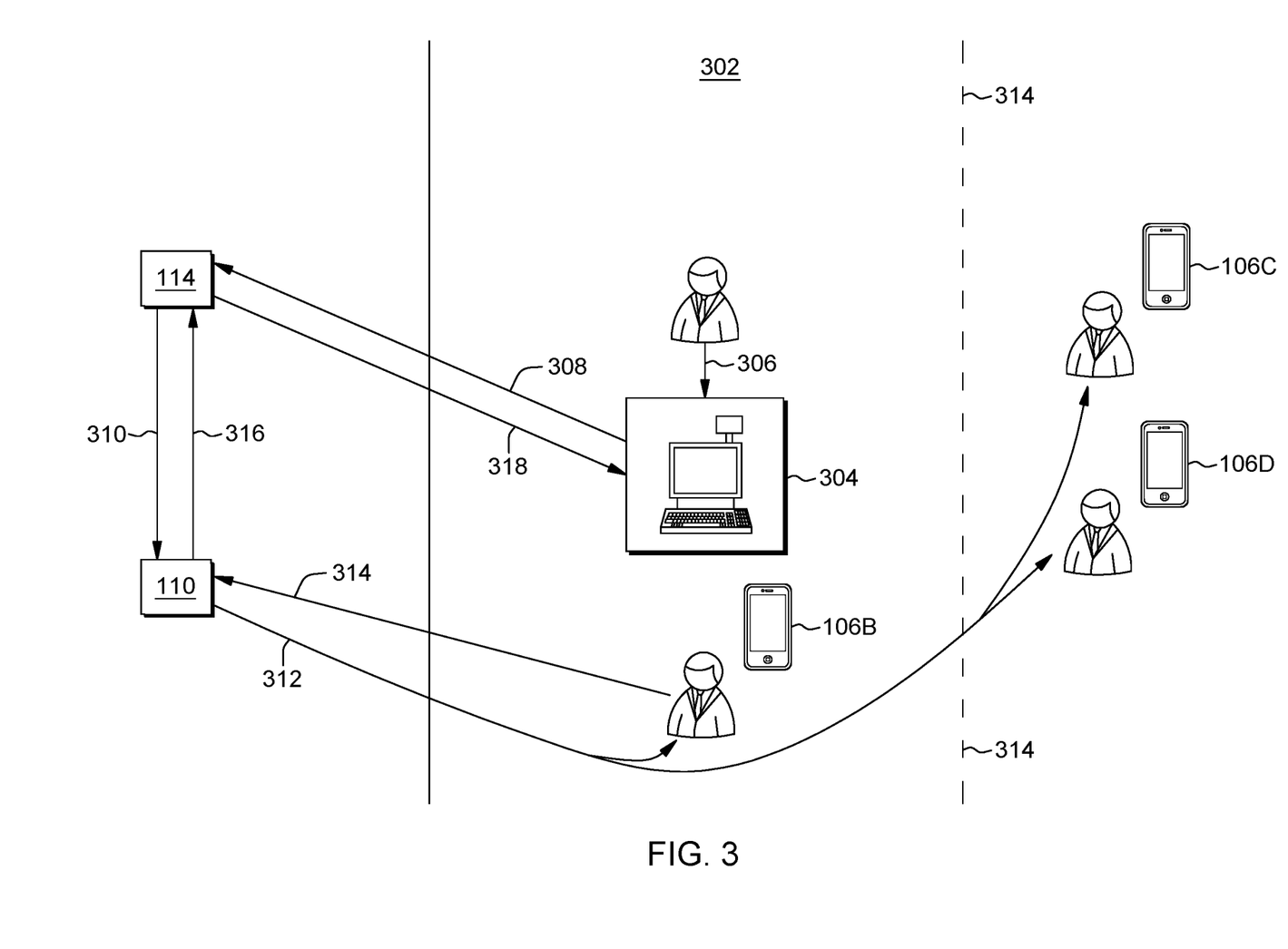
FIG. 3 is an example of a process flow of a peer validation program, in accordance with an embodiment of the present invention.

FIG. 3 is an example of a process flow of a peer validation program, in accordance with an embodiment of the present invention. In this embodiment, a user is performing a financial transaction at retail location 302, where process 306 represents the financial transaction being processed by an electronic reader device at specific location 304 within retail location 302. Process 308 represents the electronic reader device sending the financial transaction to transaction authorizer 114 for processing and authorization. Responsive to transaction authorizer 114 identifying the financial transaction as a transaction anomaly, process 310 represents peer validation program 110 receiving a request to validate the user performing the transaction anomaly from transaction authorizer 114. As previously discussed, transaction authorizer 114 can be integrated into peer validation program 110, where peer validation program 110 identifies the financial transaction as a transaction anomaly and determines to perform a peer validation via a set of validation users to validate the user performing the transaction anomaly.

Peer validation program 110 identifies boundaries to search for validation users, wherein the boundary is a predetermined distance from specific location 304 where the user is performing the transaction anomaly. In this embodiment, peer validation program 110 identifies boundary 314 as the predetermined distance from specific location 304 at location 302, where validation user with client device 106B is within boundary 314 but validation users with client device 106C and 106D are not within boundary 314. Therefore, peer validation program 110 identifies the validation user with client device 106B as the set of validation users in the identified boundaries. Process 312 represents peer validation program 110 notifying the set of validation users of a pending validation event, wherein peer validation program 110 can notify validation users with client device 106C and 106D in the event either of the two validation users relocate within boundary 314. In the event one or both of validation users with client device 106C and 106D relocate within boundary 314, peer validation program 110 identifies the validation users with client device 106C and 106D as the set of validation users as well.

Peer validation program 110 displays information for a valid user associated with the account for which the transaction anomaly was identified, where the validation user with client device 106B can validate the user performing the transaction anomaly as the valid user associated with the account. Process 314 represents peer validation program 110 receiving a confirmation or rejection from the validation user with client device 106B regarding the pending validation event. Process 316 represents peer validation program 110 sending an authorization or rejection of the transaction anomaly to transaction authorizer 114 based on the confirmation or rejection from the validation user with client device 106B regarding the pending validation event. Process 318 represents transaction authorizer 114 authorizing or declining the transaction anomaly. In this embodiment, the user performing the transaction anomaly is rejected by the validation user with client device 106B, where peer validation program 110 instructs transaction authorizer 114 to decline the transaction anomaly. Peer validation program 110 sends an alert to the valid user regarding the declined transaction anomaly. Alternatively, the user can be confirmed by the validation user with client device 106B, where peer validation program 110 instructs transaction authorizer 114 to authorize the transaction anomaly.

Figure 4:
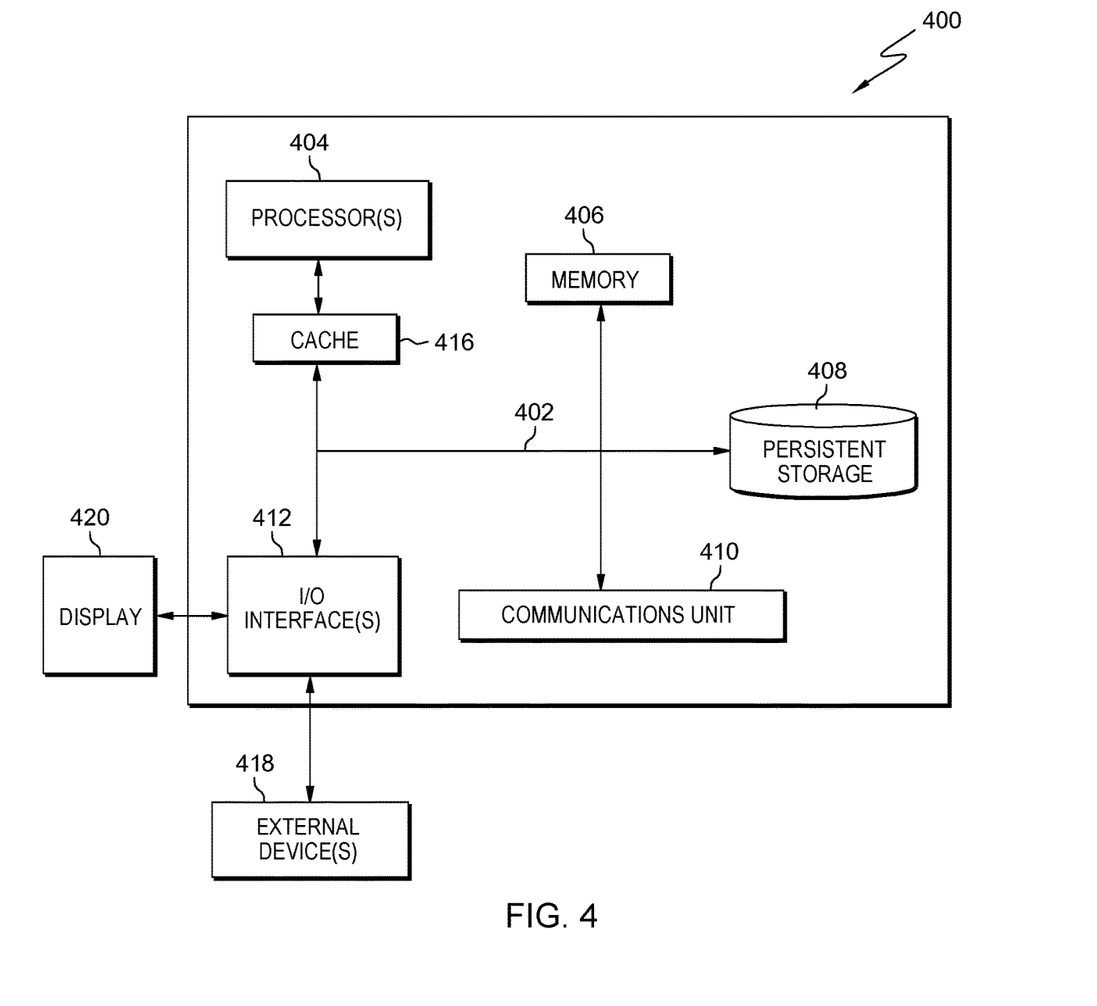
FIG. 4 depicts a block diagram of components of a computer system, such as the server computer of FIG. 1, in accordance with an embodiment of the present invention.

FIG. 4 depicts computer system 400, where server computer 102 is an example of a system that include peer validation program 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 402 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 406 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface (s) 412 also connect to display 420.

Display 420 provides a mechanism to display data to a user and may be, for example, a computer monitor. Display 420 can also function as a touch screen, such as a display of a table computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
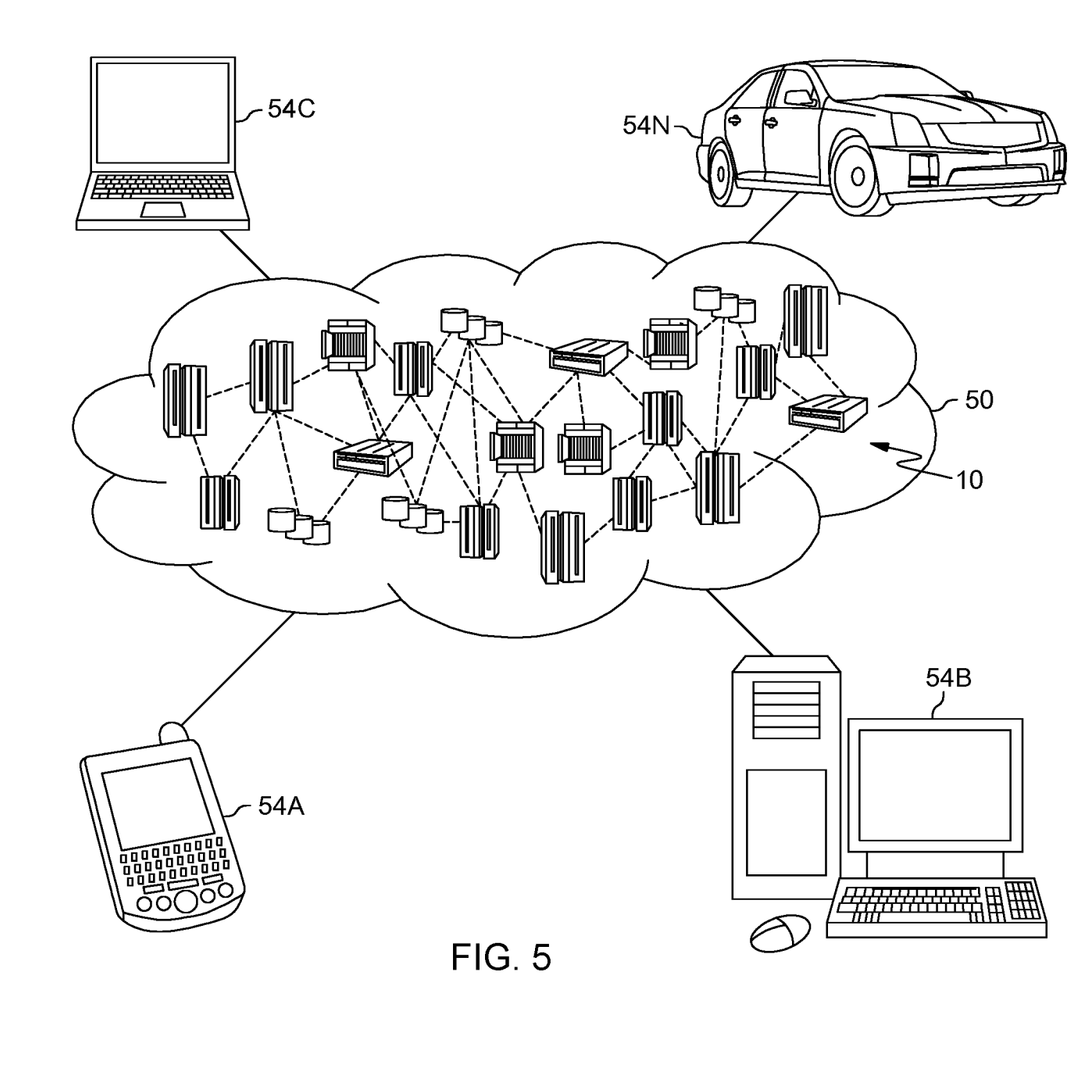
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
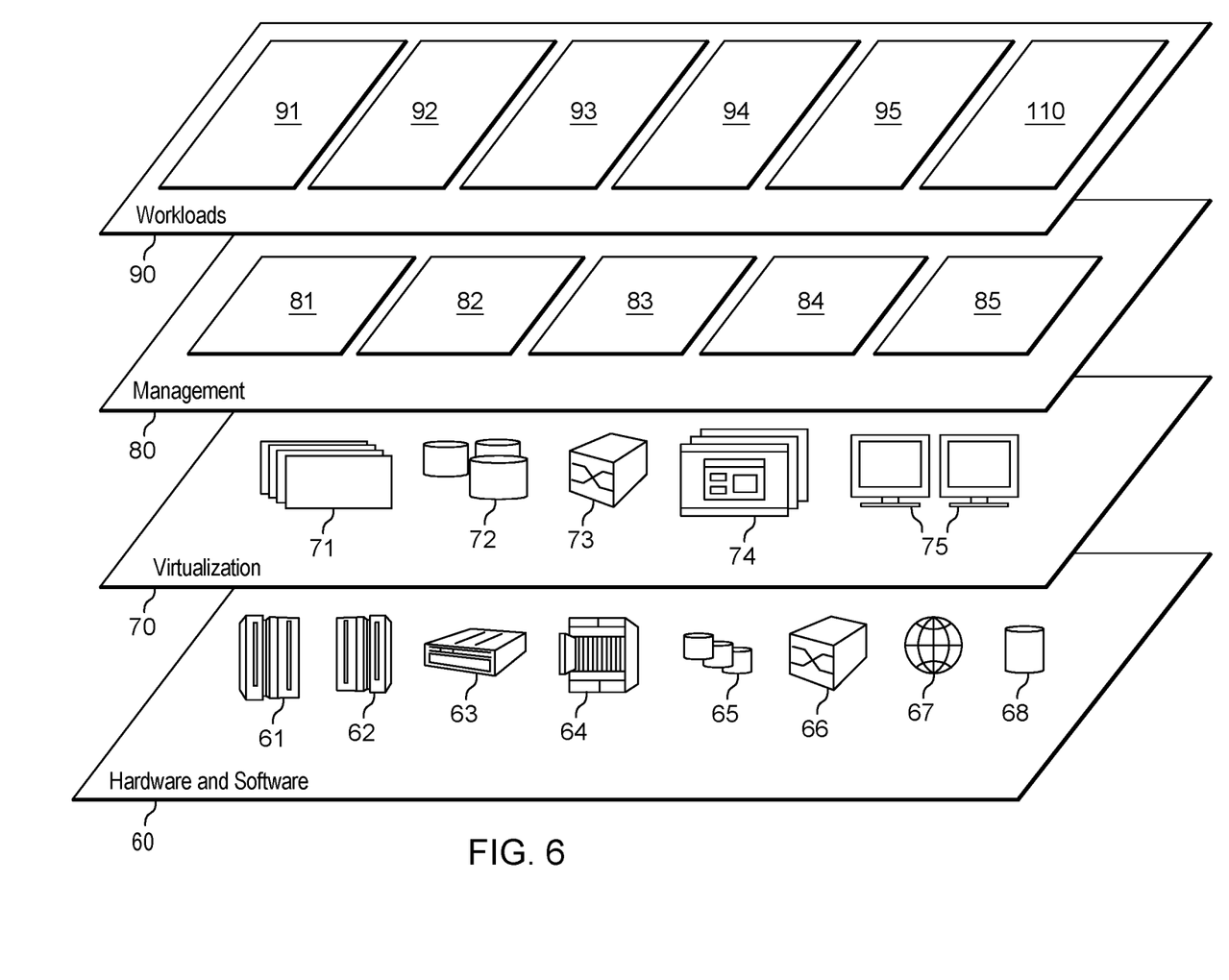
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and supply advisor program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more processors, a request to validate a user performing an electronic transaction anomaly, wherein the electronic transaction anomaly represents a potential fraudulent financial transaction;
   identifying, by one or more processors, one or more visual boundaries to search for validation users;
   identifying, by one or more processors, a set of validation users in the identified one or more visual boundaries, wherein each validation user from the set of validation users has the ability to visually confirm the user performing the electronic transaction as a valid user associated with an account for the electronic transaction anomaly;

displaying, by one or more processors, information for the valid user associated with the account for the transaction anomaly;

determining whether the user is validated for the electronic transaction anomaly; and responsive to determining the user is not validated for the electronic transaction anomaly, declining, by one or more processors, the electronic transaction anomaly.

2. The method of claim 1, wherein declining the electronic transaction anomaly further comprises:

instructing, by one or more processors, an electronic transaction authorizer associated with a financial institution to decline the transaction anomaly; and sending, by one or more processors, to the electronic transaction authorizer, one or more images of the user performing the electronic transaction anomaly captured by a client device associated with a validation user from the set of validation users.

3. The method of claim 2, further comprising:

sending, by one or more processors, one or more comments provided by the validation user from the set of validation users regarding the user performing the electronic transaction anomaly.

4. The method of claim 1, further comprising:

sending, by one or more processors, an alert to the valid user based on the electronic transaction anomaly, wherein the alert includes account information associated with the electronic transaction anomaly, a location of the electronic transaction anomaly, a time of the electronic transaction anomaly, and a statement that the user performing the electronic transaction anomaly could not be validated by the set of validation users.

5. The method of claim 1, wherein identifying the set of validation users in the identified one or more visual boundaries further comprises:

determining, by one or more processors, whether the identified set of validation users have previously opted-in to being utilized to validate the user performing the electronic transaction anomaly; and responsive to determining the identified set of validation users have previously opted-in to being utilized to validate the user performing the electronic transaction anomaly, determining, by one or more processors, to display the information for the valid user associated with the account for the electronic transaction anomaly.

6. The method of claim 1, wherein information for the valid user associated with the account for the electronic transaction includes a name, a height measurement, and hair color for the valid user.

7. A computer program product comprising:

one or more computer readable storage media and program instructions stored on at least one of the one or more storage media, the program instructions comprising:

program instructions to receive, a request to validate a user performing an electronic transaction anomaly, wherein the electronic transaction anomaly represents a potential fraudulent financial transaction;

program instructions to identify one or more visual boundaries to search for validation users;

program instructions to identify a set of validation users in the identified one or more visual boundaries, wherein each validation user from the set of validation users has the ability to visually confirm the user performing the electronic transaction as a valid user associated with an account for the electronic transaction anomaly;

program instructions to display information for the valid user associated with the account for the electronic transaction anomaly;

program instructions to determine whether the user is validated for the electronic transaction anomaly; and program instructions to, responsive to determining the user is not validated for the electronic transaction anomaly, decline the electronic transaction anomaly.

8. The computer program product of claim 7, wherein declining the electronic transaction anomaly further comprises program instructions, stored on the one or more computer readable storage media, which when executed by a processor, cause the processor to:

instruct an electronic transaction authorizer associated with a financial institution to decline the electronic transaction anomaly; and send to the electronic transaction authorizer, one or more images of the user performing the electronic transaction anomaly captured by a client device associated with a validation user from the set of validation users.

9. The computer program product of claim 8, further comprising program instructions, stored on the one or more computer readable storage media, which when executed by a processor, cause the processor to:

send one or more comments provided by the validation user from the set of validation users regarding the user performing the electronic transaction anomaly.

10. The computer program product of claim 7, further comprising program instructions, stored on the one or more computer readable storage media, which when executed by a processor, cause the processor to:

send an alert to the valid user based on the electronic transaction anomaly, wherein the alert includes account information associated with the electronic transaction anomaly, a location of the electronic transaction anomaly, a time of the electronic transaction anomaly, and a statement that the user performing the electronic transaction anomaly could not be validated by the set of validation users.

11. The computer program product of claim 7, wherein identifying a set of validation users in the identified one or more visual boundaries further comprises further comprises program instructions, stored on the one or more computer readable storage media, which when executed by a processor, cause the processor to:

determine whether the identified set of validation users have previously opted-in to being utilized to validate the user performing the electronic transaction anomaly; and responsive to determining the identified set of validation users have previously opted-in to being utilized to validate the user performing the electronic transaction anomaly, determine to display the information for the valid user associated with the account for the electronic transaction anomaly.

12. The computer program product of claim 7, wherein information for the valid user associated with the account for the electronic transaction includes a name, a height measurement, and hair color for the valid user.

13. A computer system comprising:
one or more computer processors;
one or more computer readable storage media; and
program instructions stored on the computer readable storage media for execution by at least one of the one or more computer processors, the program instructions comprising:
program instructions to receive, a request to validate a user performing an electronic transaction anomaly, wherein the electronic transaction anomaly represents a potential fraudulent financial transaction;
program instructions to identify one or more visual boundaries to search for validation users;
program instructions to identify a set of validation users in the identified one or more visual boundaries, wherein each validation user from the set of validation users has the ability to visually confirm the user performing the electronic transaction as a valid user associated with an account for the electronic transaction anomaly;
program instructions to display information for the valid user associated with the account for the electronic transaction anomaly;
program instructions to determine whether the user is validated for the electronic transaction anomaly; and
program instructions to, responsive to determining the user is not validated for the electronic transaction anomaly, decline the electronic transaction anomaly.

14. The computer system of claim 13, wherein declining the electronic transaction anomaly further comprises program instructions, stored on the one or more computer readable storage media, which when executed by a processor, cause the processor to:
instruct an electronic transaction authorizer associated with a financial institution to decline the electronic transaction anomaly; and
send to the electronic transaction authorizer, one or more images of the user performing the electronic transaction anomaly captured by a client device associated with a validation user from the set of validation users.

15. The computer system of claim 14, further comprising program instructions, stored on the one or more computer readable storage media, which when executed by a processor, cause the processor to:
send one or more comments provided by the validation user from the set of validation users regarding the user performing the electronic transaction anomaly.

16. The computer system of claim 13, further comprising program instructions, stored on the one or more computer readable storage media, which when executed by a processor, cause the processor to:
send an alert to the valid user based on the electronic transaction anomaly, wherein the alert includes account information associated with the electronic transaction anomaly, a location of the electronic transaction anomaly, a time of the electronic transaction anomaly, and a statement that the user performing the electronic transaction anomaly could not be validated by the set of validation users.

17. The computer system of claim 13, wherein identifying a set of validation users in the identified one or more visual boundaries further comprises further comprises program instructions, stored on the one or more computer readable storage media, which when executed by a processor, cause the processor to:
determine whether the identified set of validation users have previously opted-in to being utilized to validate the user performing the electronic transaction anomaly; and
responsive to determining the identified set of validation users have previously opted-in to being utilized to validate the user performing the electronic transaction anomaly, determine to display the information for the valid user associated with the account for the electronic transaction anomaly.

18. The computer system of claim 13, wherein information for the valid user associated with the account for the electronic transaction includes a name, a height measurement, and hair color for the valid user.

* * * * *